(12) United States Patent
Shigenaga et al.

(10) Patent No.: US 9,810,319 B2
(45) Date of Patent: Nov. 7, 2017

(54) CONTROL APPARATUS FOR AUTOMATIC TRANSMISSION

(71) Applicant: HONDA MOTOR CO., LTD, Minato-ku, Tokyo (JP)

(72) Inventors: Masato Shigenaga, Wako (JP); Yusuke Yoshimura, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 344 days.

(21) Appl. No.: 14/797,440

(22) Filed: Jul. 13, 2015

(65) Prior Publication Data

US 2016/0017988 A1 Jan. 21, 2016

(30) Foreign Application Priority Data

Jul. 16, 2014 (JP) ................... 2014-145895

(51) Int. Cl.
*F16H 61/12* (2010.01)
*F16H 61/14* (2006.01)

(52) U.S. Cl.
CPC ........... *F16H 61/12* (2013.01); *F16H 61/143* (2013.01); *F16H 2061/1224* (2013.01); *F16H 2061/1232* (2013.01)

(58) Field of Classification Search
None
See application file for complete search history.

(56) References Cited

U.S. PATENT DOCUMENTS

| 4,965,730 | A  | * | 10/1990 | Kurihara  | B60W 10/06 477/78 |
| 7,575,111 | B2 | * | 8/2009  | Ogata     | F16H 61/12 192/3.3 |
| 8,862,344 | B2 | * | 10/2014 | Zimmermann| F16D 48/064 180/337 |

FOREIGN PATENT DOCUMENTS

WO   2014-017239   1/2014

* cited by examiner

*Primary Examiner* — Dirk Wright
(74) *Attorney, Agent, or Firm* — Amin, Turocy & Watson LLP

(57) ABSTRACT

In an apparatus for controlling an automatic transmission connected to a prime mover mounted on a vehicle, having a torque converter equipped with a lock-up clutch, when predetermined operating conditions of the vehicle are satisfied at drive-off, a lock-up clutch engaging circuit is formed through a hydraulic supply circuit. Next it is determined whether engage-position sticking malfunction of the lock-up clutch has occurred based on a ratio of an input rotational speed of the automatic transmission relative to an output rotational speed of the prime mover and a change rate of the output rotational speed of the prime mover when the lock-up clutch engaging circuit has been formed, and fail-safe control is then implement when the sticking is determined.

15 Claims, 6 Drawing Sheets

CONTROL APPARATUS FOR AUTOMATIC TRANSMISSION

CROSS-REFERENCE TO RELATED APPLICATION

This application is based upon and claims the benefit of priority from Japanese Patent Application No. 2014-145895 filed on Jul. 16, 2014, the contents of which are incorporated herein by reference.

BACKGROUND OF THE INVENTION

Field of the Invention

This invention relates to a control apparatus for an automatic transmission, more specifically to a control apparatus for an automatic transmission that can reliably detect or determine malfunction of a torque converter lock-up clutch and implement appropriate fail-safe control when malfunction is determined.

Description of Related Art

A technique for detecting or determining lock-up clutch malfunction in an automatic transmission equipped with a torque converter having a lock-up clutch, more precisely for detecting or determining abnormal sticking of the lock-up clutch in the engaged position, can be found, for example, in Patent Reference 1 (International Publication WO 2014/017239). The teaching of Patent Reference 1 is to detect or determine engage-position sticking of a lock-up clutch based on a torque converter slip ratio of transmission input rotational speed relative to prime mover (e.g., internal combustion engine) output rotational speed, and hydraulic oil temperature.

SUMMARY OF THE INVENTION

A lock-up clutch is engaged when an automatic transmission assumes a predetermined (speed) gear, thereby improving the efficiency of power transmission from a prime mover to the automatic transmission and enhancing fuel economy performance. However, if the lock-up clutch is accidentally engaged when the automatic transmission is not in the predetermined gear, risks arise including shock caused by prime mover rotational speed fluctuation being transmitted to the transmission and of stalling occurring when the gear is changed during vehicle deceleration.

In light of this, the teaching of Patent Reference 1 is to detect or determine that the lock-up clutch is stuck in the engaged position when, in the absence of a lock-up clutch engage command, the calculated torque converter slip ratio is small and the temperature of the hydraulic oil is low. However, depending on the vehicle driving environment, ambient temperature and other factors, the calculated slip ratio may be abnormally small even in the absence of a lock-up clutch engage command, and in such a case, a false lock-up clutch engage-position sticking determination may make it difficult to implement fail-safe control appropriately.

The object of this invention is therefore to overcome the aforesaid problem by providing a control apparatus for an automatic transmission that can reliably determine or detect lock-up clutch engage-position sticking and implement appropriate fail-safe control.

In order to achieve the object, this invention provides an apparatus for controlling an automatic transmission that is connected to a prime mover mounted on a vehicle and changes speed of rotation of the prime mover to transmit the speed of rotation to driven wheels, having a torque converter interposed between the prime mover and the automatic transmission and equipped with a lock-up clutch, a hydraulic supply circuit that supplies hydraulic pressure to the lock-up clutch and the automatic transmission, and a controller that controls operation of the lock-up clutch and the automatic transmission through the hydraulic supply circuit, comprising: a rotational speed ratio calculator that calculates a ratio of an input rotational speed of the automatic transmission relative to an output rotational speed of the prime mover; and a lock-up clutch engage-position sticking determiner that causes the controller to form a lock-up clutch engaging circuit through the hydraulic supply circuit when it is determined that predetermined operating conditions of the vehicle are satisfied at vehicle drive-off, determines whether engage-position sticking malfunction of the lock-up clutch has occurred based on the calculated ratio and a change rate of the output rotational speed of the prime mover when the lock-up clutch engaging circuit has been formed, and causing the controller to implement fail-safe control when the sticking is determined.

BRIEF DESCRIPTION OF THE DRAWINGS

The above and other objects and advantages will be more apparent from the following description and drawings in which.

DETAILED DESCRIPTION OF THE INVENTION

A control apparatus for an automatic transmission according to an embodiment of this invention will be explained with reference to the attached drawings in the following.

Figure 1:
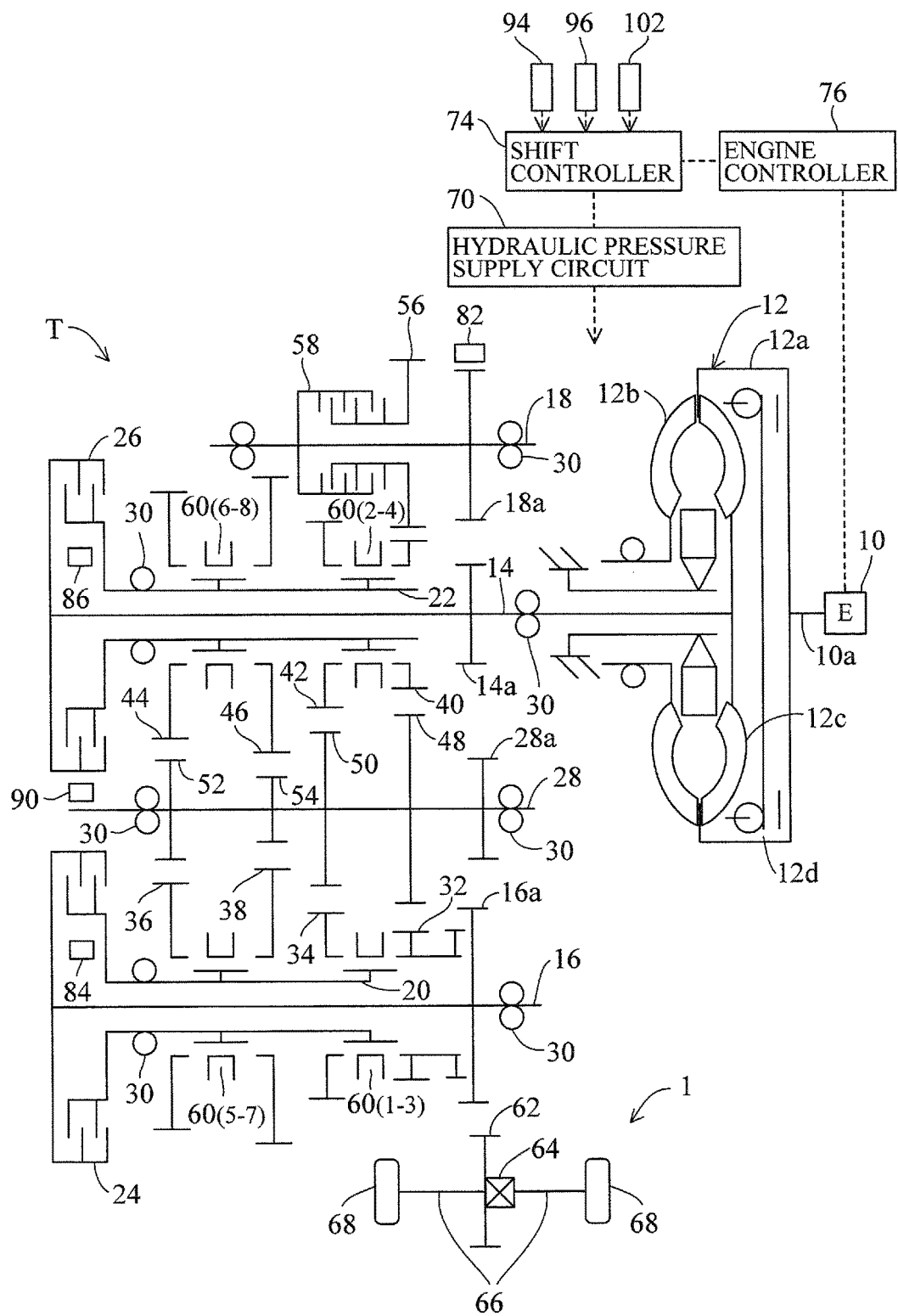
FIG. 1 is an overall schematic view of a control apparatus for an automatic transmission according to an embodiment of this invention.

FIG. 1 is an overall schematic view of a control apparatus for an automatic transmission according to an embodiment of this invention.

Reference numeral 1 in FIG. 1 designates a vehicle equipped with an automatic transmission (called "transmission" hereinafter) T. The transmission T is a twin-clutch (double-clutch) transmission with 8 forward-speed and 1 reverse-speed gears and has P, R, N and D ranges, for example.

The transmission T is connected through a torque converter 12 to a driveshaft 10a connected to a crankshaft of an engine (prime mover) 10, and is equipped with an even-numbered speed (2, 4, 6 and 8 speed) input shaft (second input shaft) 14 and with an odd-numbered speed (1, 3, 5 and 7 speed) input shaft (first input shaft) 16 parallel to the even-numbered speed input shaft 14. The engine 10 is, for example, a gasoline-fueled, spark-ignition internal combustion engine.

The torque converter 12 has a pump impeller 12b fixed on a drive plate 12a directly connected to the driveshaft 10a of the engine 10, a turbine runner 12c fixed on the even-numbered speed input shaft 14, and a lock-up clutch 12d, whereby the driving force (rotation) of the engine 10 is inputted to the even-numbered speed input shaft 14 through the torque converter 12.

An idler shaft 18 is provided in the transmission T in parallel with the even-numbered speed input shaft 14 and odd-numbered speed input shaft 16. The even-numbered speed input shaft 14 is connected to the idler shaft 18 through gears 14a, 18a, and the odd-numbered speed input shaft 16 is connected to the idler shaft 18 through gears 16a, 18a, whereby the even-numbered speed input shaft 14, the odd-numbered speed input shaft 16, and idler shaft 18 rotate together with the rotation of the engine 10.

Further, a first auxiliary input shaft 20 and a second auxiliary input shaft 22 are concentrically installed on the peripheries of the odd-numbered speed input shaft 16 and the even-numbered speed input shaft 14 respectively to be rotatable relative thereto.

The odd-numbered speed input shaft 16 and first auxiliary input shaft 20 are connected through a first clutch 24 and transmit rotation of the engine 10 through the first clutch 24, while the even-numbered speed input shaft 14 and the second auxiliary input shaft 22 are connected through a second clutch 26 and transmit rotation of the engine 10 through the second clutch 26. The first and second clutches 24 and 26 comprise of wet multi-plate clutches that operate by being supplied with working oil pressure (hydraulic pressure).

An output shaft 28 is installed between and in parallel with the even-numbered speed input shaft 14 and odd-numbered speed input shaft 16. The even-numbered speed input shaft 14, odd-numbered speed input shaft 16, idler shaft 18 and output shaft 28 are rotatably supported by bearings 30.

On the first auxiliary input shaft 20 on the odd-numbered speed side are fixed a first-speed drive gear 32, a third-speed drive gear 34, a fifth-speed drive gear 36 and a seventh-speed drive gear 38, and on the second auxiliary input shaft 22 on the even-numbered speed side are fixed a second-speed drive gear 40, a fourth-speed drive gear 42, a sixth-speed drive gear 44 and an eighth-speed drive gear 46.

On the output shaft 28 are fixed a first-second speed driven gear 48 that mates with the first-speed drive gear 32 and the second-speed drive gear 40, a third-fourth speed driven gear 50 that mates with the third-speed drive gear 34 and the fourth-speed drive gear 42, a fifth-sixth speed driven gear 52 that mates with the fifth-speed drive gear 36 and the sixth-speed drive gear 44, and a seventh-eighth speed driven gear 54 that mates with the seventh-speed drive gear 38 and eighth-speed drive gear 46.

The idler shaft 18 rotatably supports an RVS (reverse) idler gear 56 that mates with the first-second speed driven gear 48 fixed on the output shaft 28. The idler shaft 18 and the RVS idler gear 56 are connected through an RVS clutch 58. Like the first and second clutches 24 and 26, the RVS clutch 58 also comprises a wet multi-plate clutch that operates by being supplied with hydraulic pressure.

On the odd-numbered speed input shaft 16 are provided a first-third speed gear engaging mechanism 60(1-3) that selectively engages or fixes the first-speed drive gear 32 and the third-speed drive gear 34 with the first auxiliary input shaft 20, and a fifth-seventh speed gear engaging mechanism 60(5-7) that selectively engages or fixes the fifth-speed drive gear 36 and the seventh-speed drive gear 38 with the first auxiliary input shaft 20.

On the even-numbered speed input shaft 14 are provided a second-fourth speed gear engaging mechanism 60(2-4) that selectively engages or fixes the second-speed drive gear 40 and the fourth-speed drive gear 42 with the second auxiliary input shaft 22, and a sixth-eighth speed gear engaging mechanism 60(6-8) that selectively engages or fixes the sixth-speed drive gear 44 and the eighth-speed drive gear 46 with the second auxiliary input shaft 22. The four gear engaging mechanisms are designated collectively by reference symbol 60.

When the first clutch 24 or the second clutch 26 is engaged, the driving force of the engine 10 is transmitted from the odd-numbered speed input shaft 16 to the first auxiliary input shaft 20 or from the even-numbered speed input shaft 14 to the second auxiliary input shaft 22 and further to the output shaft 28 through the aforesaid drive gears and driven gears.

During reverse operation, the driving force of the engine 10 is transmitted to the output shaft 28 through the even-numbered speed input shaft 14, gear 14a, gear 18a, idler shaft 18, RVS clutch 58, RVS idler gear 56, and first-second speed driven gear 48. The output shaft 28 is connected to a differential mechanism 64 through gears 28a and 62, and the differential mechanism 64 is connected to wheels (driven wheels) 68 through drive shafts 66. The vehicle 1 is represented by wheels 68 and other components.

All of the gear engaging mechanisms 60 are operated by being supplied with hydraulic pressure (indicative of shifting force). A hydraulic pressure supply circuit 70 is provided for supplying hydraulic pressure to the gear engaging mechanisms 60, first and second clutches 24 and 26, RVS clutch 58 and torque converter 12.

Figure 2:
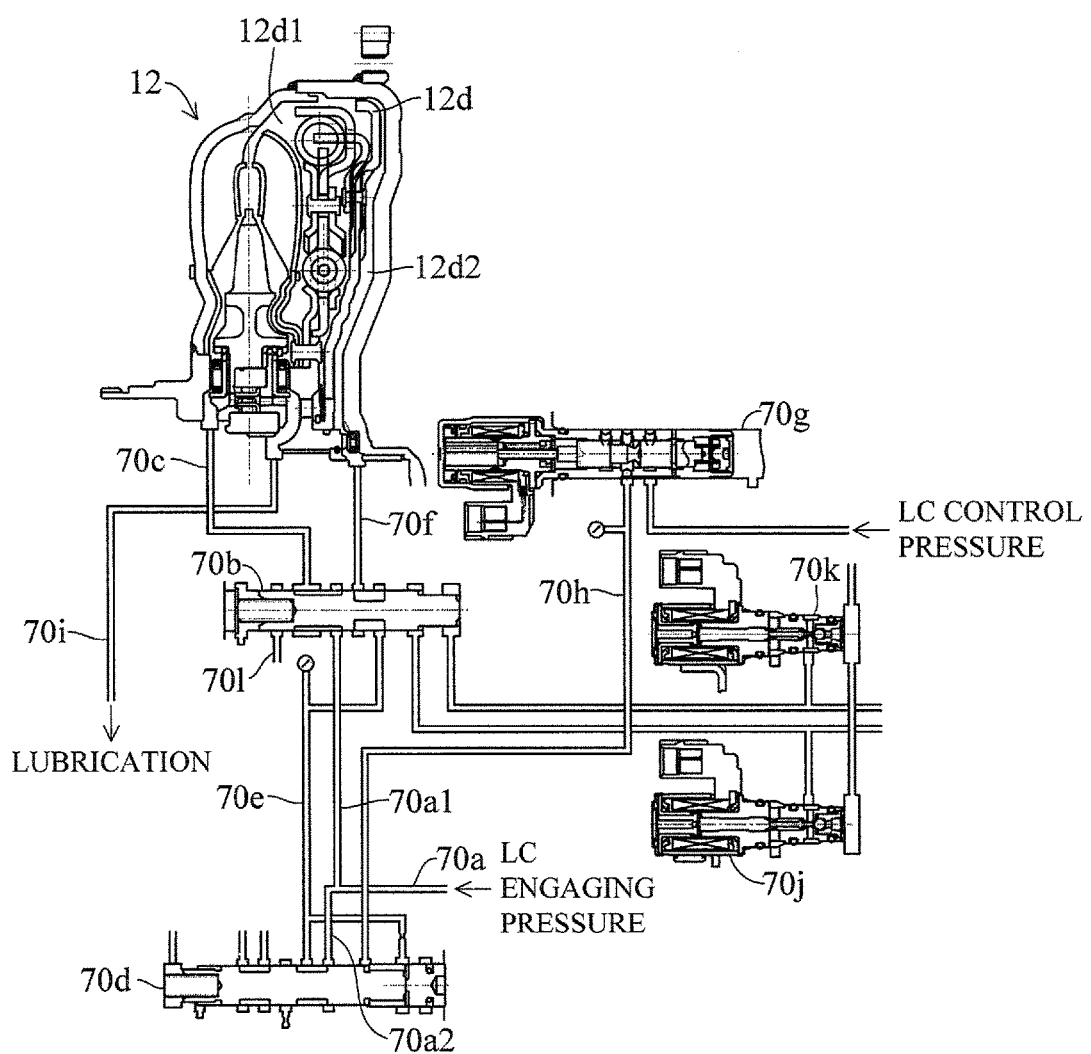
FIG. 2 is a hydraulic circuit diagram concretely illustrating part of the structure of the hydraulic pressure supply circuit shown in FIG. 1.

FIG. 2 is a hydraulic circuit diagram concretely illustrating part of the structure of the hydraulic pressure supply circuit 70, with particular focus on the portions related to control of the lock-up clutch 12d. FIG. 2 shows a state in which a circuit (lock-up clutch engaging circuit) has been formed that is capable of supplying engaging pressure to the lock-up clutch 12d.

In the hydraulic pressure supply circuit 70, hydraulic oil pumped from a reservoir by an oil pump is pressure-regulated to the required pressure (LC engaging pressure) by a regulator valve and a torque converter regulator valve (neither shown) and supplied to an oil passage 70a.

The LC engaging pressure supplied to the oil passage 70a is sent through a branch passage 70a1 to an LC shift valve 70b and is also supplied through an oil passage 70c to an internal pressure chamber 12d1 of the torque converter to press the lock-up clutch 12d toward the engage-position (side of a backpressure chamber 12d2).

On the other hand, hydraulic pressure sent from the oil passage 70a through a branch passage 70a2 to an LC control valve 70d is suitably pressure-regulated there and is then supplied through an oil passage 70e, the LC shift valve 70b and an oil passage 70f to a backpressure chamber 12d2 to press the lock-up clutch 12d toward the disengage-position (side of the internal pressure chamber 12d1).

The LC control valve 70d houses a spool and its position (pressure-regulation point) changes in response to hydraulic pressure (LC control pressure) sent from a linear solenoid valve (electromagnetic control valve) 70g through an oil passage 70h. More specifically, the position of the spool of the LC control valve 70d can be varied by controlling current flow supplied to the linear solenoid valve 70g so as to regulate the LC control pressure. With this, the hydraulic pressure inputted to the LC control valve 70d through the branch passage 70a2 can be suitably regulated for output to the backpressure chamber 12d2 of the torque converter 12. Therefore, the engaging force, i.e., the slip ratio of the lock-up clutch 12d is controlled by regulating the hydraulic pressure difference between the LC engaging pressure supplied to the internal pressure chamber 12d1 and the hydraulic pressure supplied to the backpressure chamber 12d2.

The linear solenoid valve 70g is a hydraulic control valve configured as an N/C (normally closed) valve that moves the spool in proportion to applied current flow so as to vary or regulate pressure output from its output port in accordance with a linear characteristic, and when no current is applied, moves the spool to the closed position.

Some of the hydraulic oil supplied to the internal pressure chamber 12d1 of the torque converter 12 is discharged through an oil passage 70i to moving parts of the automatic transmission as lubricating oil.

The operation of the LC shift valve 70b is controlled by on-off solenoid valves 70j and 70k. This embodiment is configured so that when the on-off solenoid valves 70j and 70k are both de-energized, the position of a spool of the LC shift valve 70b is that indicated in FIG. 2, by which the aforesaid lock-up clutch engaging circuit is formed and the hydraulic pressure is supplied both to the internal pressure chamber 12dl and to the backpressure chamber 12d2.

On the other hand, when either or both of the on-off solenoid valves 70j and 70k are energized, the position of the spool of the LC shift valve 70b moves to the left side in the figure to form a circuit that does not supply hydraulic pressure or cuts off supply of hydraulic pressure to the internal pressure chamber 12dl of the lock-up clutch 12d.

More specifically, when either or both of the on-off solenoid valves 70j and 70k are energized to move the spool position of the LC shift valve 70b to the left side in the figure, the branch passage 70al and the oil passage 70f communicate, while the oil passage 70e is cut off by the LC shift valve 70b. Further, the oil passage 70c connected to the internal pressure chamber 12d1 is communicated with the oil passage 70l, so that the hydraulic pressure that has been supplied to the internal pressure chamber 12dl is discharged. Thus, in this state, hydraulic pressure is supplied to only the backpressure chamber 12d2 and the lock-up clutch 12d is disengaged.

Based on the foregoing, explanation will be made with reference to FIG. 3A and FIG. 3B regarding occurrence of abnormal sticking of the lock-up clutch 12d in the engage-position, more exactly occurrence of a malfunction in the linear solenoid valve 70g that controls the operation of the lock-up clutch 12d.

Figure 3A:
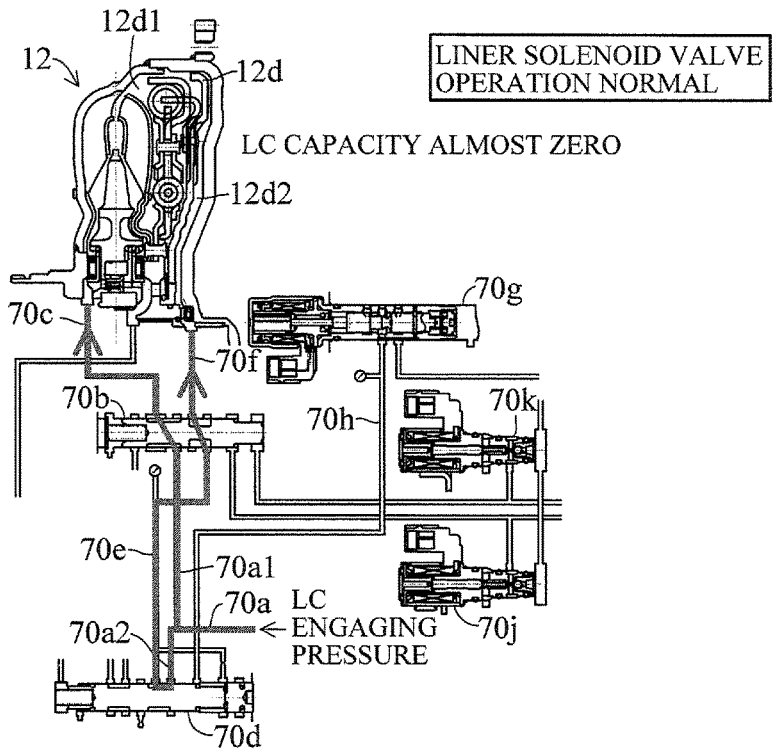
FIGS. 3A and 3B are a set of hydraulic circuit diagrams explaining operation of the hydraulic pressure supply circuit shown in FIG. 2.
Figure 3B:
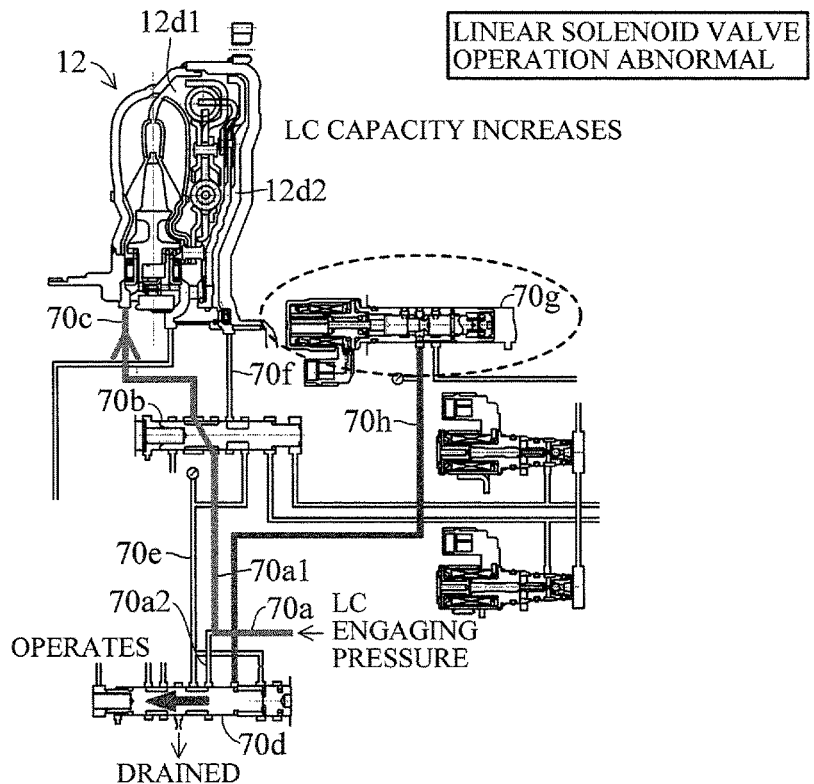

FIGS. 3A and 3B are a set of figures that show a state in which the amount of current (lock-up clutch control pressure command value) sent to the LC control valve 70d is zero, i.e., in the absence of a command to engage the lock-up clutch 12d, wherein FIG. 3A shows a case in which the linear solenoid valve 70g is operating normally and FIG. 3B shows a case in which a malfunction has occurred in the linear solenoid valve 70g, specifically a malfunction that causes the linear solenoid valve 70g to be stuck to a valve opening position by being undesirably supplied with high current or by spool's foreign particle biting, etc. Both of FIGS. 3A and 3B show a state in which the lock-up clutch engaging circuit has been formed, i.e., a state in which both of the on-off solenoid valves 70j and 70k are de-energized.

As shown in FIG. 3A, in a case where the linear solenoid valve 70g is operating normally and the lock-up clutch control pressure command value is zero, the valve position of the LC control valve 70d is in the initial state (closed position). In this case, the LC engaging pressure input to the LC control valve 70d is outputted from the LC control valve 70d and supplied to the backpressure chamber 12d2 through the oil passage 70e, LC shift valve 70b and oil passage 70f without being regulated or lowered. Simultaneously, the LC engaging pressure is also supplied to the internal pressure chamber 12dl through the branch passage 70a1, LC shift valve 70b and oil passage 70c.

In other words, the internal pressure chamber 12dl and the backpressure chamber 12d2 of the torque converter 12 are supplied with equal hydraulic pressures, so that the lock-up clutch 12d is maintained at a neutral position in a disengaged state (zero LC capacity state).

However, as shown in FIG. 3B, when the malfunction to stick the linear solenoid valve 70g in the opening position occurs, the spool of the LC control valve 70d is forcibly moved to the left side in the figure, so that the circuit connecting the branch passage 70a2 and the oil passage 70e is cut off by the LC control valve 70d. Further, the hydraulic oil that has been supplied to the backpressure chamber 12d2 is discharged to the reservoir through the oil passages 70f and 70e. As a result, the lock-up clutch 12d is engaged and LC capacity is generated, and in the particular state shown in FIG. 3B, the lock-up clutch 12d assumes a completely engaged condition.

Although the hydraulic pressure supply circuit 70 plays a role in supplying hydraulic oil not only to the torque converter 12 but also to the gear engaging mechanisms 60, first and second clutches 24 and 26, and RVS clutch 58 of the transmission T, explanation with regard to these constituents is omitted because they are not directly related to the present invention.

Returning to the explanation of FIG. 1, the transmission T is equipped with a shift controller 74. The shift controller 74 comprises an electronic control unit (ECU) equipped with a microcomputer. Further, an engine controller 76, similarly comprising an electronic control unit (ECU) equipped with a microcomputer, is installed for controlling operation of the engine 10.

The shift controller 74 is configured to communicate with the engine controller 76 and acquires various information from the engine controller 76, including engine speed (output rotational speed of the prime mover) NE, throttle opening, and accelerator position AP.

First, second, third and fourth rotational speed sensors 82, 84, 86 and 90 installed on the transmission T respectively output a signal indicating input rotational speed NM of the transmission T, signals indicating rotational speeds of the first and second auxiliary input shafts 20, 22, and a signal indicating rotational speed of the output shaft 28 (output rotational speed of the transmission T) NC (namely, vehicle speed V).

First and second hydraulic pressure sensors 94 and 96 provided on oil passages of the hydraulic pressure supply circuit 70 connected to the first and second clutches 24 and 26 output signals indicating hydraulic oil pressures supplied to the first and second clutches 24 and 26.

A range selector position sensor 102 provided near a range selector (not shown) installed at a driver's seat of the vehicle 1 outputs a signal indicating a range to which the driver has operated the range selector (selected range) among, for example, P, R, N and D ranges.

The outputs of these sensors are all sent to the shift controller 74. Based on these sensor outputs, plus other data obtained through communication with the engine controller 76, the shift controller 74 energizes/de-energizes linear solenoid valves and the like (none of which are shown) to control the operation of the first and second clutches 24 and 26, RVS clutch 58, gear engaging mechanisms 60 and lock-up clutch 12d, and thereby control the operation of the transmission T. In this specification, the shift controller 74 constitutes the control apparatus for the automatic transmission.

The operation of the apparatus of this embodiment will be explained next. As explained in the foregoing, the object of this embodiment is to reliably determine or detect at the time of vehicle 1 drive-off (start) whether the lock-up clutch 12d has incurred engage-position sticking malfunction, i.e., whether energization of the linear solenoid valve 70g, spool's foreign particle biting and the like has occurred, so as to enable appropriate implementation of fail-safe control.

Figure 4:
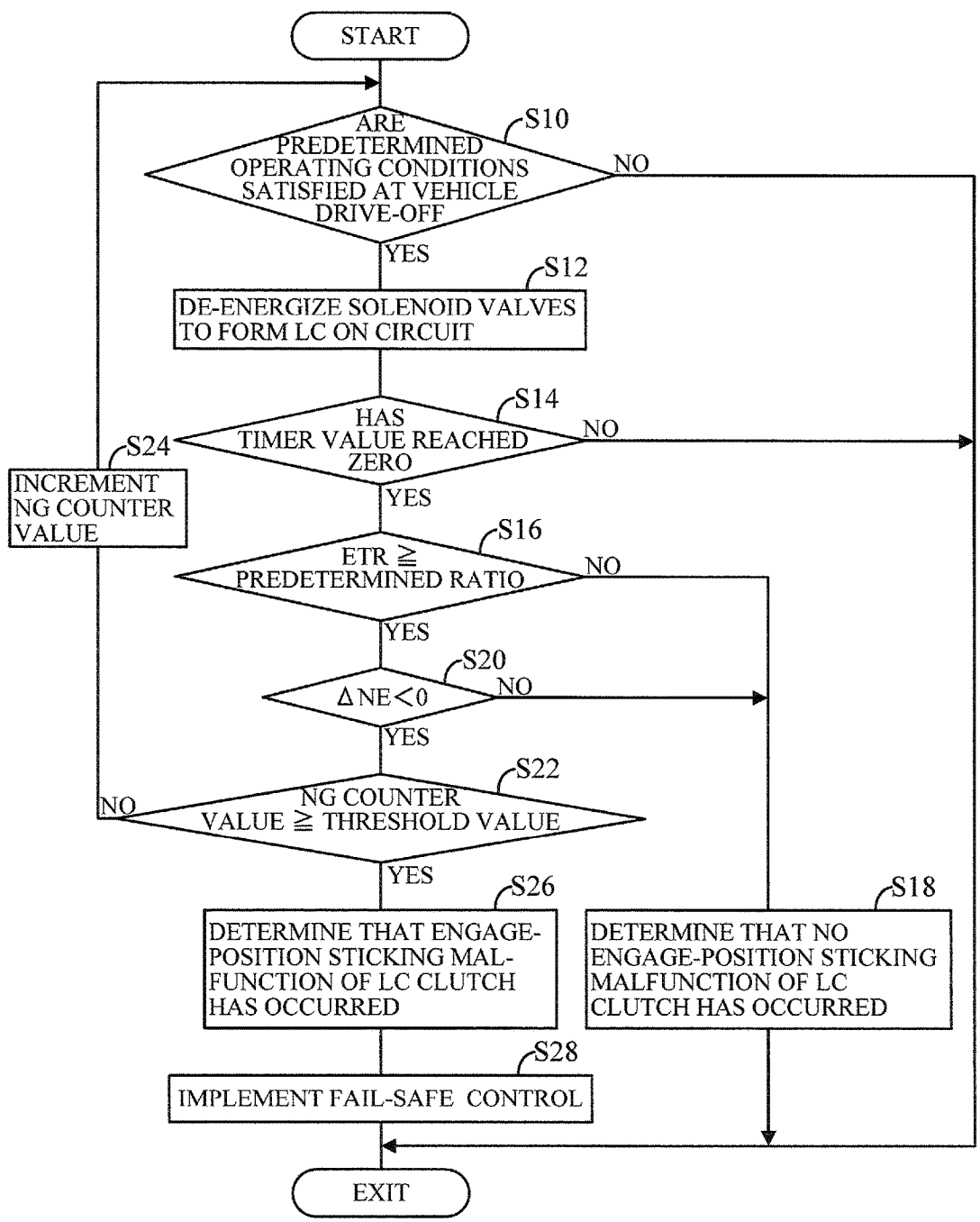
FIG. 4 is a flowchart showing operation of the apparatus according to the embodiment of this invention.

FIG. 4 is a flowchart showing this control. The process according to this flowchart is initiated once when the vehicle 1 drives off.

Now to explain, the program begins at S10, in which it is determined whether predetermined operating conditions of the vehicle 1 that enables implementation of engage-position sticking discrimination/control of the lock-up clutch 12d are satisfied at vehicle drive-off (S: process Step).

By "predetermined operating conditions" are specifically meant to include one or more that the engine 10 is running (IG turned ON), that the voltage of a battery (not shown) constituting the power source of the shift controller 74 is equal to or greater than a predetermined value that ensures operation of the shift controller 74, that the output rotational speed NE of the engine 10 is equal to or greater than a predetermined rotational speed, that the input rotational speed NM of the transmission T is equal to or greater than a prescribed rotational speed, that fuel-cut control of the engine 10 is not in effect, that the gear of the transmission T is set to the first-speed gear (LOW), that the lock-up clutch control pressure command value (current flow through the linear solenoid valve 70g) that determines the engaging pressure of the lock-up clutch 12d is less than a predetermined value, that the amount of accelerator position AP change is not negative, that engine torque is equal to or greater than a predetermined torque, that this is the first malfunction discrimination processing performed in the current driving cycle (one cycle from IG turned ON to IG turned OFF), and that the ratio of the input rotational speed NM of the transmission T relative to the output speed NE of the engine 10 (NM/NE; indicated as ETR in FIG. 4 and other drawings) is equal to or less than a predetermined ratio (second predetermined ratio).

These conditions will be explained in detail. As explained with reference to FIG. 2, the hydraulic pressure supplied to the hydraulic pressure supply circuit 70 is generated by an oil pump driven by the engine 10. Therefore, no hydraulic pressure is generated in the hydraulic pressure supply circuit 70 unless the engine 10 is running. For this reason, that the engine 10 is running (IG turned ON) is made a condition.

Accurate malfunction detection control cannot be performed when the shift controller 74 that performs the control shown in FIG. 4 is itself not being supplied with adequate power. Therefore, that the voltage of the power supply (battery) is equal to or greater than a predetermined value is made a condition.

Depending on the accuracy of the rotational speed sensor 82, a risk arises of not being possible to accurately detect rotational speed when the output speed NE of the engine 10 or the transmission input rotational speed NM is extremely low. Therefore, that the output engine speed NE is equal to or greater than a predetermined rotational speed and the transmission input rotational speed NM is equal to or greater than a prescribed rotational speed is made a condition. Further, in order to enable accurate malfunction detection, the engine 10 is confirmed not to be in an unstable rotating condition by setting as additional conditions that fuel-cut control of the engine 10 is not in effect, that the amount of accelerator position AP change is not negative, and that engine torque is not less than a predetermined torque.

In view of the fact that the control in this embodiment is implemented at drive-off of the vehicle 1 in an operating region in which the lock-up clutch 12d is not ordinarily engaged, that the gear of the transmission T is set to first-speed gear (LOW) is made a condition. Further, when the lock-up clutch control pressure command value that determines the engaging pressure of the lock-up clutch 12d is equal to or greater than a predetermined pressure, more exactly in a situation where the lock-up clutch control pressure command value is not set to zero and LC control pressure can be produced irrespective of abnormality of the linear solenoid valve 70g, a false determination of engage-position sticking malfunction might occur. Therefore, that the lock-up clutch control pressure command value is less than a predetermined value is made a condition.

Moreover, in order to avoid false determination, the processing is performed only once at drive-off of the vehicle 1. Therefore, that this is the first malfunction discrimination processing performed in the current driving cycle is made a condition.

In addition, discrimination is commenced from an unmistakably disengaged state of the lock-up clutch 12d and to ensure reliable discrimination of engage-position sticking malfunction of the lock-up clutch 12d, that ETR at the start of control is equal to or less than the second predetermined ratio, i.e., that the differential rotation between the engine speed NE and the transmission input rotational speed NM is large is made a condition.

In the flowchart, when the result in S10 is NO, engage-position sticking malfunction of the lock-up clutch 12d cannot be accurately determined, so the program is terminated without performing the processing explained below. On the other hand, when the result in S10 is YES, the program proceeds to S12, in which the solenoid valves 70j and 70k are both de-energized to form the lock-up clutch engaging circuit (indicated as "LC ON circuit" in FIG. 4).

At drive-off of the vehicle 1, ordinarily the lock-up clutch 12d is disengaged and control is performed to amplify the torque of the engine 10 through the torque converter 12. In a normal situation, therefore, no lock-up clutch engaging circuit is formed at drive-off of the vehicle 1.

However, as explained with reference to FIG. 2, when no lock-up clutch engaging circuit is formed, hydraulic pressure is not supplied to the internal pressure chamber 12d1 of the lock-up clutch 12d, so that even if abnormality should occur in the linear solenoid valve 70g that controls the operation of the lock-up clutch 12d, engage-position sticking malfunction of the lock-up clutch 12d cannot be determined or detected. So in this embodiment, the lock-up clutch engaging circuit is intentionally formed (S12) when it is determined in S10 that the predetermined operating conditions of the vehicle 1 are satisfied.

The program next proceeds to S14, in which it is determined whether the value of a timer for preventing false detection (false detection prevention timer) has reached zero, i.e., it is determined whether a time period has passed. The false detection prevention timer is a countdown timer provided for determining whether the engine 10 has reached a stable condition (so-called steady-state condition) after the vehicle 1 satisfied the predetermined operating conditions when it drives off. A configuration is also possible that determines establishment of the predetermined operating conditions, including the forming of the lock-up clutch engaging circuit in S12 and the passage of the false detection prevention timer time period in S14.

So long as the result in S14 remains NO, there is a risk of the rotation of the engine 10 being unstable, so the processing discussed later is skipped and the aforesaid processing is repeated until the result in S14 becomes YES. When the result in S14 is YES, the program proceeds to S16, in which it is determined whether the slip ratio (ETR) of the input rotational speed NM of the transmission T relative to the output speed NE of the engine 10, i.e., NM/NE is equal to or greater than a predetermined ratio. Here, the slip ratio (ETR) means the torque converter speed ratio.

The predetermined ratio is set to a value by which it can be determined that the differential rotation between the engine speed NE and the input rotational speed NM of the transmission is small and the lock-up clutch 12d is almost fully or fully engaged, namely to around 1.0. Therefore, when the result in S16 is NO, the program proceeds to S18, in which it is determined that no engage-position sticking malfunction of the lock-up clutch 12d has occurred.

On the other hand, when the result in S16 is YES, the program proceeds to S20, in which it is determined whether change in engine speed NE per unit time (change rate) ΔNE at the time of the first affirmative result in S16, i.e., at the time point of the first determination of the calculated ETR being equal to or greater than the predetermined ratio, is negative.

As stated above, at drive-off of the vehicle 1, the lock-up clutch engaging circuit is not formed until the result in S10 becomes YES, and since the rotation of the engine 10 is inputted to the transmission T through the torque converter 12 in the embodiment, the engine speed NE and the transmission input rotational speed NM are ordinarily different at this time point, with the engine speed NE being somewhat higher than the transmission input rotational speed NM.

However, when a malfunction occurs in the linear solenoid valve 70g that controls the lock-up clutch 12d, then upon formation of the lock-up clutch engaging circuit, the lock-up clutch 12d is forcibly engaged even if the lock-up clutch control pressure command value is not generated and zero, whereupon the engine speed NE and the transmission input rotational speed NM converge on substantially the same value, namely, a phenomenon arises of the engine speed NE decelerating under the influence of the input rotational speed NM.

As was stated concerning the object of the present invention, depending on the driving environment, ambient temperature and the like of the vehicle 1, the output engine speed NE and the transmission input rotational speed NM sometimes become substantially the same (i.e., ETR becomes equal to or greater than the predetermined ratio) even when no engage-position sticking has occurred in the lock-up clutch 12d. However, in the case where engage-position sticking malfunction of the lock-up clutch 12d has not occurred, no phenomenon occurs of the engine speed NE decelerating despite the operation of the engine 10 being stable.

In this embodiment, therefore, accurate detection or determination of engage-position sticking malfunction of the lock-up clutch 12d is made possible by making a determination in S20 as to whether the engine speed NE change rate ΔNE is negative.

In the flowchart, when the result in S20 is NO, the program proceeds to S18, in which engage-position sticking malfunction of the lock-up clutch 12d is determined not to have occurred. When, to the contrary, the result in S20 is YES, the program proceeds to S22, in which it is determined whether the value of an NG counter is equal to or greater than a threshold value.

The NG counter counts the time period during which ETR is continuously equal to or greater than the predetermined ratio and is set to an initial value of zero. The first result in S22 is therefore NO, and the program proceeds to S24, in which the value of the NG counter is incremented by 1, whereafter the foregoing processing is repeated until the determination in S22 becomes YES. It should be noted that the determination in the aforesaid S20 needs to be made only at the time of the first affirmative determination in S16 and can therefore be skipped in the second and ensuing determinations.

The threshold value is set to a value that makes it possible to determine that engage-position sticking malfunction of the lock-up clutch 12d has unmistakably occurred, and in this specification the time period defined by the threshold value is called a prescribed time period. Up to the time that the determination in S22 becomes YES, the value of the NG counter is reset to zero when the determination in any of S10, S14 and S116 is negative.

When the result in S22 is YES, i.e., when ETR is determined to have been equal to or greater than the predetermined ratio continuously for the prescribed time period or longer (i.e., when it is determined that ETR is kept to be equal to or greater than the predetermined ratio for the prescribed time period or longer), the program proceeds to S26, in which it is determined that engage-position sticking malfunction of the lock-up clutch 12d has occurred.

The program next proceeds to S28, in which fail-safe control (Fail-Safe Action) is implemented. Specifically, a warning device or indicator installed on the dashboard at the driver's seat is used to caution the driver, and engine stall-avoidance control is implemented to disengage all of the clutches connecting the engine 10 and the wheels 68 (first and second clutches 24, 26 and RVS clutch 58), whereafter the program is terminated.

The reason for this is that the engine might stall if the vehicle 1 were to be decelerated and stopped with the lock-up clutch 12d having sustained engage-position sticking malfunction. So in this embodiment, when the lock-up clutch 12d is determined to have sustained engage-position sticking, the clutches 24, 26 and 58 that transmit the output of the engine 10 to the wheels 68 are all disengaged to prevent transmission of torque to the engine 10 from the side of the wheels 68, thereby reliably avoiding stalling of the engine.

Figure 5:
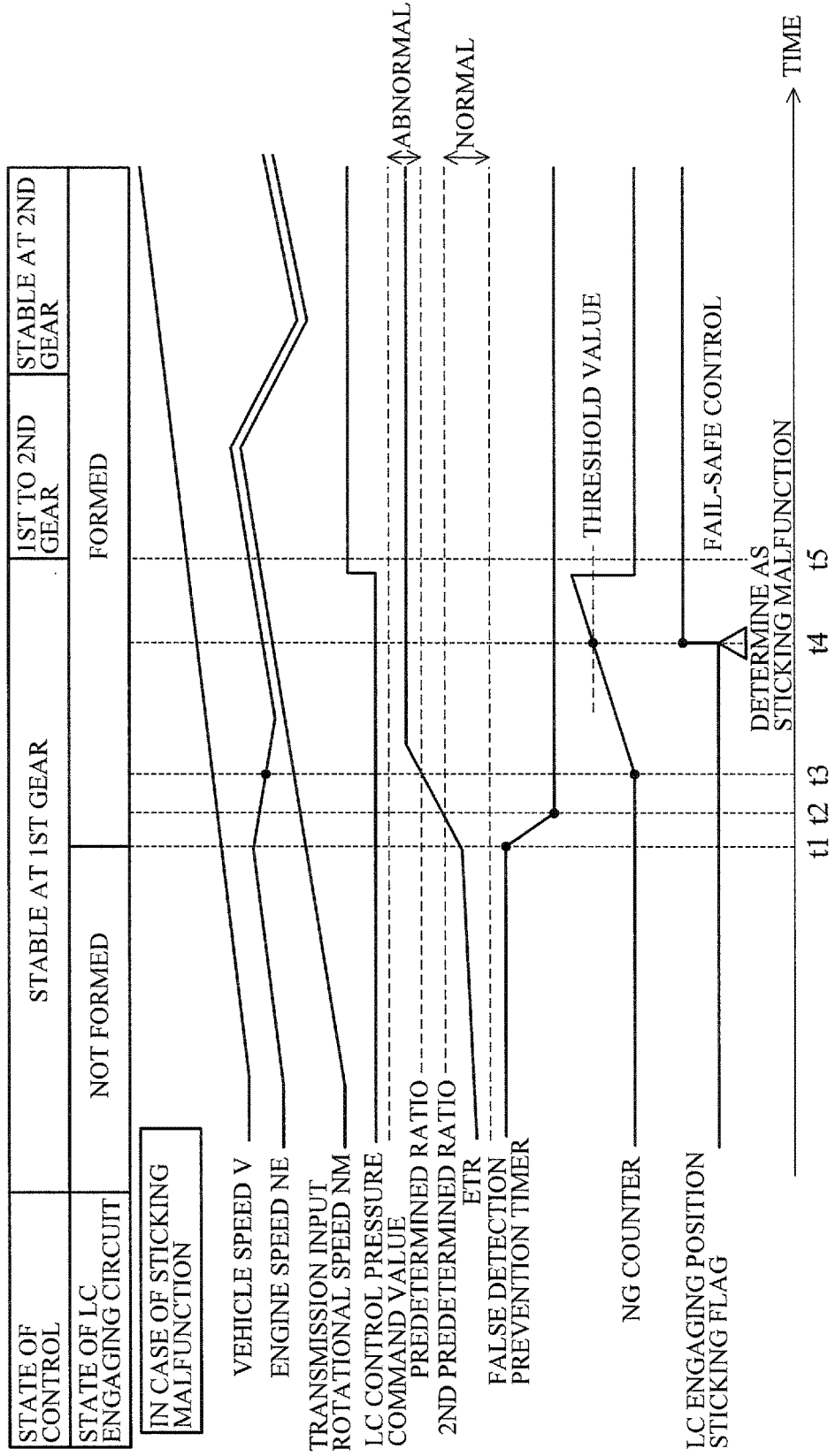
FIG. 5 is a time chart explaining processing of the flowchart of FIG. 4.
Figure 6:
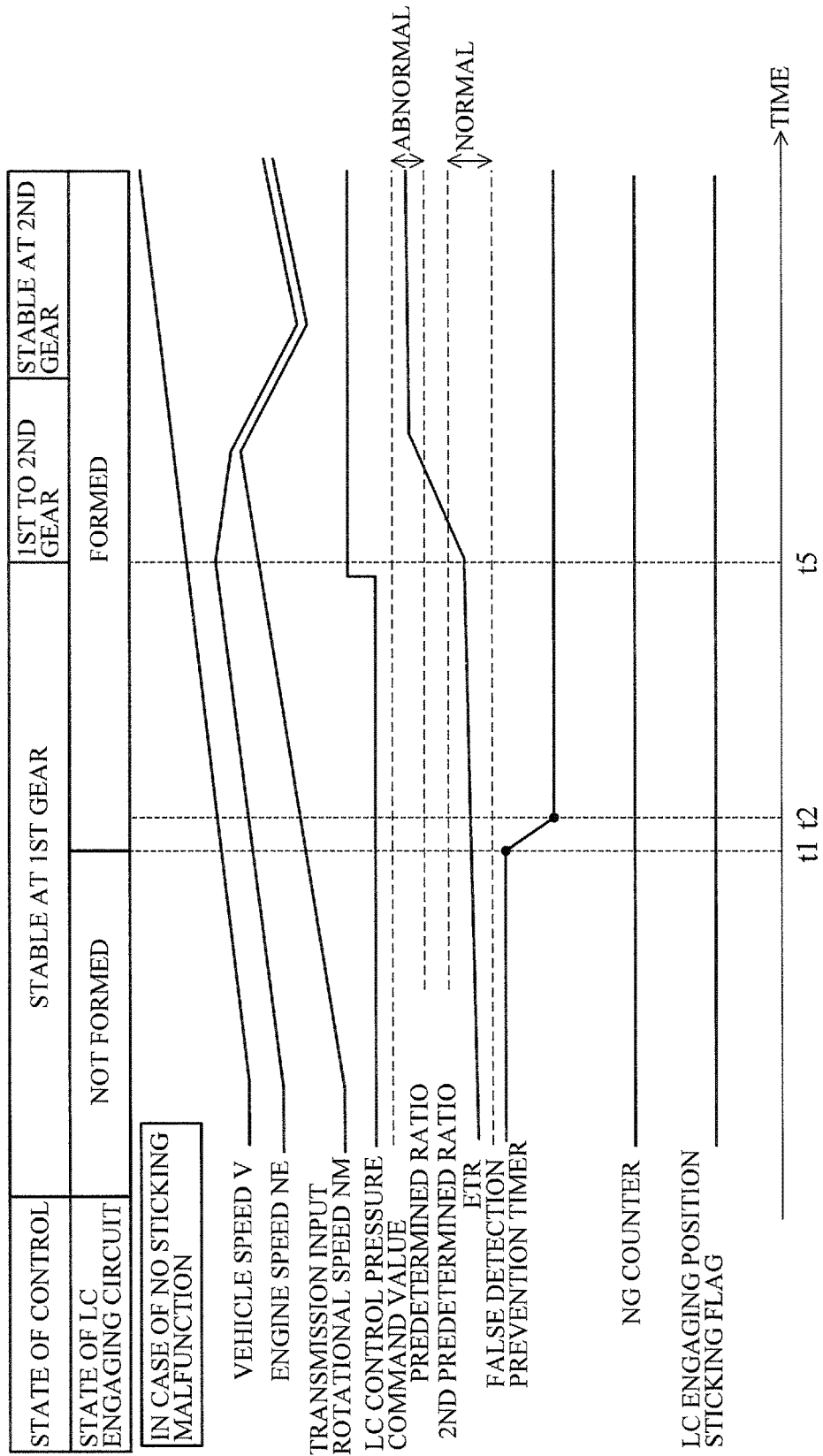
FIG. 6 is a time chart similarly explaining processing of the flowchart of FIG. 4.

FIGS. 5 and 6 are time charts for explaining the aforesaid operations.

To explain first with reference to FIG. 5, when the predetermined operating conditions are established at time t1, the solenoid valves 70j and 70k are de-energized to form the lock-up clutch engaging circuit (LC ON circuit) and the false detection prevention timer counting is started. When the timer count becomes zero at time t2, determination of whether the slip ratio (ETR) of the transmission input rotational speed NM relative to the engine output speed NE (NM/NE) is equal to or greater than the predetermined ratio is commenced.

Upon the first determination of the slip ratio (ETR) having become equal to or greater than the predetermined ratio at time t3, a determination is made as to whether the engine speed NE change rate ΔNE at this time is negative. Since, as illustrated, the value of ΔNE at time t3 is negative, the value of the NG counter for determining engage-position sticking malfunction of the lock-up clutch 12*d* is successively incremented.

When the value of the NG counter becomes equal to or greater than the threshold value at time t4, occurrence of engage-position sticking malfunction of the lock-up clutch 12*d*, namely occurrence of abnormality such as unintentional energization in the linear solenoid valve 70*g* that controls operation of the lock-up clutch 12*d*, is determined, whereupon the bit of an LC engage-position sticking NG flag is set to 1 and fail-safe control of the vehicle 1 is started.

On the other hand, as shown in FIG. 6, when the lock-up clutch 12*d* has not sustained engage-position sticking malfunction, then even after the count of the false detection prevention timer becomes zero at time t2 and up to the implementation of shift control at time t5, neither does the slip ratio (ETR) become equal to or greater than the predetermined ratio nor is there a determination of engage-position sticking malfunction of the lock-up clutch 12*d* having occurred.

As stated above, the embodiment is configured to have an apparatus or method for controlling an automatic transmission (T) that is connected to a prime mover (engine 10) mounted on a vehicle (1) and changes speed of rotation of the prime mover (10) to transmit the speed of rotation to driven wheels (68), having a torque converter (12) interposed between the prime mover (10) and the automatic transmission (T) and equipped with a lock-up clutch (12*d*), a hydraulic supply circuit (70) that supplies hydraulic pressure to the lock-up clutch (12*d*) and the automatic transmission (T), and a controller (74) that controls operation of the lock-up clutch (12*d*) and the automatic transmission (T) through the hydraulic supply circuit (70), comprising: a rotational speed ratio calculator (74) that calculates a ratio (ETR) of an input rotational speed of the automatic transmission (T) relative to an output rotational speed of the prime mover (12); and a lock-up clutch engage-position sticking determiner (74, S10-S28) that causes the controller to form a lock-up clutch engaging circuit through the hydraulic supply circuit (70) when it is determined that predetermined operating conditions of the vehicle (1) are satisfied at vehicle drive-off, determines whether engage-position sticking malfunction of the lock-up clutch (12*d*) has occurred based on the calculated ratio (ETR) and a change rate (ΔNE) of the output rotational speed of the prime mover (12) when the lock-up clutch engaging circuit has been formed, and causing the controller to implement fail-safe control when the sticking is determined. Therefore, occurrence of engage-position sticking malfunction of the lock-up clutch 12*d* can be accurately determined at vehicle drive-off.

Particularly since engage-position sticking malfunction of the lock-up clutch 12*d* is determined based on the prime mover output rotational speed change rate, occurrence of engage-position sticking malfunction of the lock-up clutch 12*d* can be accurately determined, making it possible to implement appropriate fail-safe control for avoiding shock occurrence during driving in a condition with the lock-up clutch 12*d* stuck in the engaged position.

In the apparatus or method, the lock-up clutch engage-position sticking determiner determines that the engage-position sticking malfunction of the lock-up clutch has occurred, when it is determined that the calculated ratio (ETR) is kept to be equal to or greater than a predetermined ratio for a prescribed time period and when the change rate (ΔNE) of the output rotational speed of the prime mover (10) was negative at a time at which the calculated ratio (ETR) was first determined to be equal to or greater than the predetermined ratio (S10-S26), whereby, in addition to the aforesaid effects and advantages, it becomes possible to determine occurrence of engage-position sticking malfunction of the lock-up clutch 12*d* even more accurately.

In the apparatus or method, the lock-up clutch engage-position sticking determiner causes the controller to implement the fail-safe control by disengaging clutches (first, second clutches 24, 26, RVS clutch 58) that transmit the output of the prime mover to driven wheels when it is determined that the engage-position sticking malfunction of the lock-up clutch (12*d*) has occurred (S28), whereby, in addition to the aforesaid effects and advantages, it becomes possible to avoid shock occurrence during driving in a condition with the lock-up clutch 12*d* stuck in the engaged position and to implement fail-safe control for preventing stalling of the prime mover even more appropriately.

In the apparatus or method, the predetermined operating conditions include at least that the output rotational speed of the prime mover (10) is equal to or greater than a predetermined rotational speed, that the input rotational speed of the automatic transmission (T) is equal to or greater than a prescribed rotational speed, that the calculated ratio (ETR) is equal to or less than a second predetermined ratio, and that a lock-up clutch control pressure command value that defines engaging pressure of the lock-up clutch (12*d*) is less than a predetermined value, whereby, in addition to the aforesaid effects and advantages, occurrence of a false lock-up clutch engage-position sticking determination can be appropriately avoided and occurrence of engage-position malfunction of the lock-up clutch 12*d* can be even more accurately determined.

In the apparatus or method, the predetermined conditions include that the prime mover (10) is under a stable rotating condition, whereby, in addition to the aforesaid effects and advantages, occurrence of a false lock-up clutch engage-position sticking determination can be more appropriately avoided.

In the apparatus or method, the predetermined conditions include that a gear of the automatic transmission (T) is set to a gear (e.g., first speed gear) to be used at the vehicle drive-off, whereby, in addition to the aforesaid effects and advantages, occurrence of a false lock-up clutch engage-position sticking determination can be more appropriately avoided.

In the apparatus or method, wherein the lock-up clutch engage-position sticking determiner determines the engage-position sticking malfunction of the lock-up clutch (12*d*) only once at the vehicle drive-off, whereby, in addition to the aforesaid effects and advantages, the determination can be reduced to a necessary limit.

Although malfunction is determined using the slip ratio (ETR) of the transmission input rotational speed NM relative to the engine output speed NE (NM/NE) in the aforesaid embodiment, it is possible instead to make the determination based on its reciprocal (NE/NM) or based on the differential rotation between the transmission input rotational speed NM and the engine speed NE.

Further, the structure of the transmission T is not limited to the illustrated structure and any structure is acceptable insofar as it is provided with a configuration similar to the aforesaid hydraulic supply circuit.

Moreover, although various conditions are enumerated as the predetermined operating conditions, the conditions are not necessarily limited to these and, for example, conditions such as the temperature of the hydraulic oil can also be included.

Further, although an engine was exemplified as the prime mover, this is not a limitation and, for example, the prime mover can instead by a hybrid of an engine and an electric motor.

While the invention has thus been shown and described with reference to specific embodiment, it should be noted that the invention is in no way limited to the details of the described arrangement; changes and modifications may be made without departing from the scope of the appended claims.

What is claimed is:

1. An apparatus for controlling an automatic transmission that is connected to a prime mover mounted on a vehicle and changes speed of rotation of the prime mover to transmit the speed of rotation to driven wheels, having a torque converter interposed between the prime mover and the automatic transmission and equipped with a lock-up clutch, a hydraulic supply circuit that supplies hydraulic pressure to the lock-up clutch and the automatic transmission, and a controller that controls operation of the lock-up clutch and the automatic transmission through the hydraulic supply circuit, comprising:

a rotational speed ratio calculator that calculates a ratio of an input rotational speed of the automatic transmission relative to an output rotational speed of the prime mover; and a lock-up clutch engage-position sticking determiner that causes the controller to form a lock-up clutch engaging circuit through the hydraulic supply circuit when it is determined that predetermined operating conditions of the vehicle are satisfied at vehicle drive-off, determines whether engage-position sticking malfunction of the lock-up clutch has occurred based on the calculated ratio and a change rate of the output rotational speed of the prime mover when the lock-up clutch engaging circuit has been formed, and causing the controller to implement fail-safe control when the sticking is determined.

2. The apparatus according to claim 1, wherein the lock-up clutch engage-position sticking determiner determines that the engage-position sticking malfunction of the lock-up clutch has occurred, when it is determined that the calculated ratio is kept to be equal to or greater than a predetermined ratio for a prescribed time period and when the change rate of the output rotational speed of the prime mover was negative at a time at which the calculated ratio was first determined to be equal to or greater than the predetermined ratio.

3. The apparatus according to claim 1, wherein the lock-up clutch engage-position sticking determiner causes the controller to implement the fail-safe control by disengaging clutches that transmit the output of the prime mover to driven wheels when it is determined that the engage-position sticking malfunction of the lock-up clutch has occurred.

4. The apparatus according to claim 1, wherein the predetermined operating conditions include at least that the output rotational speed of the prime mover is equal to or greater than a predetermined rotational speed, that the input rotational speed of the automatic transmission is equal to or greater than a prescribed rotational speed, that the calculated ratio is equal to or less than a second predetermined ratio, and that a lock-up clutch control pressure command value that defines engaging pressure of the lock-up clutch is less than a predetermined value.

5. The apparatus according to claim 1, wherein the predetermined conditions further include that the prime mover is under a stable rotating condition.

6. The apparatus according to claim 1, wherein the predetermined conditions further include that a gear of the automatic transmission is set to a gear to be used at the vehicle drive-off.

7. The apparatus according to claim 1, wherein the lock-up clutch engage-position sticking determiner determines the engage-position sticking malfunction of the lock-up clutch only once at the vehicle drive-off.

8. A vehicle comprising the apparatus of claim 1.

9. A method for controlling an automatic transmission connected to a prime mover mounted on a vehicle through a torque converter, comprising:

calculating a ratio of an input rotational speed of the automatic transmission relative to an output rotational speed of the prime mover, and forming a lock-up clutch engaging circuit through a hydraulic supply circuit when predetermined operating conditions of the vehicle are satisfied at vehicle drive-off, determining whether an engage-position sticking malfunction of a lock-up clutch of the torque converter has occurred based on the calculated ratio and a change rate of the output rotational speed of the prime mover when the lock-up clutch engaging circuit has been formed, and implementing fail-safe control when the engage-position sticking malfunction is determined.

10. The method according to claim 9, wherein determining that the engage-position sticking malfunction of the lock-up clutch has occurred comprises determining that the calculated ratio is equal to or greater than a predetermined ratio for a prescribed time period and when the change rate of the output rotational speed of the prime mover is negative at a time at which the calculated ratio is first determined to be equal to or greater than the predetermined ratio.

11. The method according to claim 9, wherein implementing the fail-safe control comprises disengaging clutches that transmit the output of the prime mover to driven wheels when the engage-position sticking malfunction of the lock-up clutch occurs.

12. The method according to claim 9, wherein the predetermined operating conditions include at least that the output rotational speed of the prime mover is equal to or greater than a predetermined rotational speed, that the input rotational speed of the automatic transmission is equal to or greater than a prescribed rotational speed, that the calculated ratio is equal to or less than a second predetermined ratio, and that a lock-up clutch control pressure command value that defines engaging pressure of the lock-up clutch is less than a predetermined value.

13. The method according to claim 9, wherein the predetermined conditions further include that the prime mover is under a stable rotating condition.

14. The method according to claim 9, wherein the predetermined conditions further include that a gear of the automatic transmission is set to a gear to be used at the vehicle drive-off.

15. The method according to claim 9, wherein determining the engage-position sticking malfunction of the lock-up clutch is performed only once at the vehicle drive-off.

* * * * *